(12) United States Patent
Neubauer et al.

(10) Patent No.: US 11,545,884 B2
(45) Date of Patent: Jan. 3, 2023

(54) STATOR MODULE FOR A LINEAR DRIVE OF A CONTAINER-HANDLING MACHINE

(71) Applicant: Krones AG, Neutraubling (DE)

(72) Inventors: Michael Neubauer, Grassau (DE); Hartmut Davidson, Zeitlarn (DE)

(73) Assignee: Krones AG, Neutraubling (DE)

( * ) Notice: Subject to any disclaimer, the term of this patent is extended or adjusted under 35 U.S.C. 154(b) by 438 days.

(21) Appl. No.: 16/615,779

(22) PCT Filed: May 8, 2018

(86) PCT No.: PCT/EP2018/061823
§ 371 (c)(1),
(2) Date: Nov. 21, 2019

(87) PCT Pub. No.: WO2018/219598
PCT Pub. Date: Dec. 6, 2018

(65) Prior Publication Data
US 2020/0244152 A1 Jul. 30, 2020

(30) Foreign Application Priority Data
May 29, 2017 (DE) .................... 10 2017 208 948.2

(51) Int. Cl.
*H02K 41/02* (2006.01)
*B67C 3/22* (2006.01)
*H02K 5/04* (2006.01)

(52) U.S. Cl.
CPC .............. *H02K 41/02* (2013.01); *B67C 3/22* (2013.01); *H02K 5/04* (2013.01); *B67C 2003/228* (2013.01)

(58) Field of Classification Search
CPC ...... H02K 1/02; H02K 5/04; B67C 2003/228; B67C 3/22; H02P 6/006; H02P 6/00;
(Continued)

(56) References Cited

U.S. PATENT DOCUMENTS 8,878,399 B2 * 11/2014 Hanamura ............. H02K 11/21
310/12.33
2016/0207720 A1 7/2016 Hanisch et al.

FOREIGN PATENT DOCUMENTS

CN 105899447 A 8/2016
DE 3402143 A1 8/1984
(Continued)

OTHER PUBLICATIONS

International Search Report and Written Opinion for International Patent Application No. PCT/EP2018/061823 dated Aug. 24, 2018.
(Continued)

*Primary Examiner* — Antony M Paul
(74) *Attorney, Agent, or Firm* — Lowenstein Sandler LLP

(57) ABSTRACT

The disclosure relates to a stator module for a linear drive of a container-handling machine in the beverage processing industry, comprising a housing in which a core and at least one coil are arranged, wherein the stator module comprises a media supply for supplying a gas into the interior of the housing and the media supply is adapted to pressurize the interior of the housing, as well as a corresponding container-handling machine and a method of operating a container-handling machine.

20 Claims, 4 Drawing Sheets

(58) Field of Classification Search
CPC ...... H02P 6/04; H02P 6/06; H02P 6/24; H02P 6/32; H02P 7/00; H02P 25/06; H02P 21/28; H02P 23/00; H02P 25/00; H02P 27/00; H02P 27/04; H02P 27/06; H02P 1/00; H02P 1/42; H02P 1/46
See application file for complete search history.

(56) References Cited

FOREIGN PATENT DOCUMENTS

| DE | 3402143-02 | * | 5/1994 | ........... B65G 37/005 |
|----|------------|---|--------|-------------------------|
| DE | 10000793 C1 | | 8/2001 | |
| DE | 102005043577 B4 | | 3/2007 | |
| DE | 10 2012 204721 A1 | | 9/2013 | |
| DE | 102014102630 A1 | | 8/2015 | |
| JP | S60191914 A | | 9/1985 | |
| JP | S63123722 A | | 5/1988 | |

OTHER PUBLICATIONS

First Office Action for Chinese Application No. 201880035064.1 dated Nov. 16, 2020, with English translation, 15 pages.
Notice of Allowance for Chinese Application No. 201880035064.1 dated Jan. 10, 2022, English translation only, 2 pages.
Second Office Action for Chinese Application No. 201880035064.1 dated Jun. 17, 2021, English translation only, 5 pages.

* cited by examiner

STATOR MODULE FOR A LINEAR DRIVE OF A CONTAINER-HANDLING MACHINE

RELATED APPLICATIONS

This Application is a National Stage of International Application No. PCT/EP2018/061823 filed May 8, 2018, which claims the benefit of German Patent Application 10 2017 208 948.2 filed May 29, 2017, both of which are incorporated by reference herein.

FIELD OF THE INVENTION

The present disclosure refers to a stator module for a linear drive, a container-handling machine comprising a corresponding linear drive and a method of operating a container-handling machine.

BACKGROUND

Linear drives and in particular long-stator systems are known from the state of the art.

For example, DE 10 2014 102 630 A1 shows a long-stator system that can be used in connection with the hygienic filling of products and thus also in the beverage processing industry. The actual drive is located outside a clean room where the filling takes place, whereas the inside of the clean room or isolator can be kept sterile. Since the motor here is physically separated from the area where the filling takes place, it does not come into contact with any cleaning media or even the product.

However, it is not always possible or practicable to achieve complete physical separation of motor and filling area, especially with filling machines that are designed without a clean room. In such cases, the drive is typically located or extends through the filling area.

Such arrangements mean that at least some components, such as the motor here, can be affected by contamination, which can lead to problems and unwanted downtimes, especially in the beverage processing industry.

DETAILED DESCRIPTION

Figure 1:
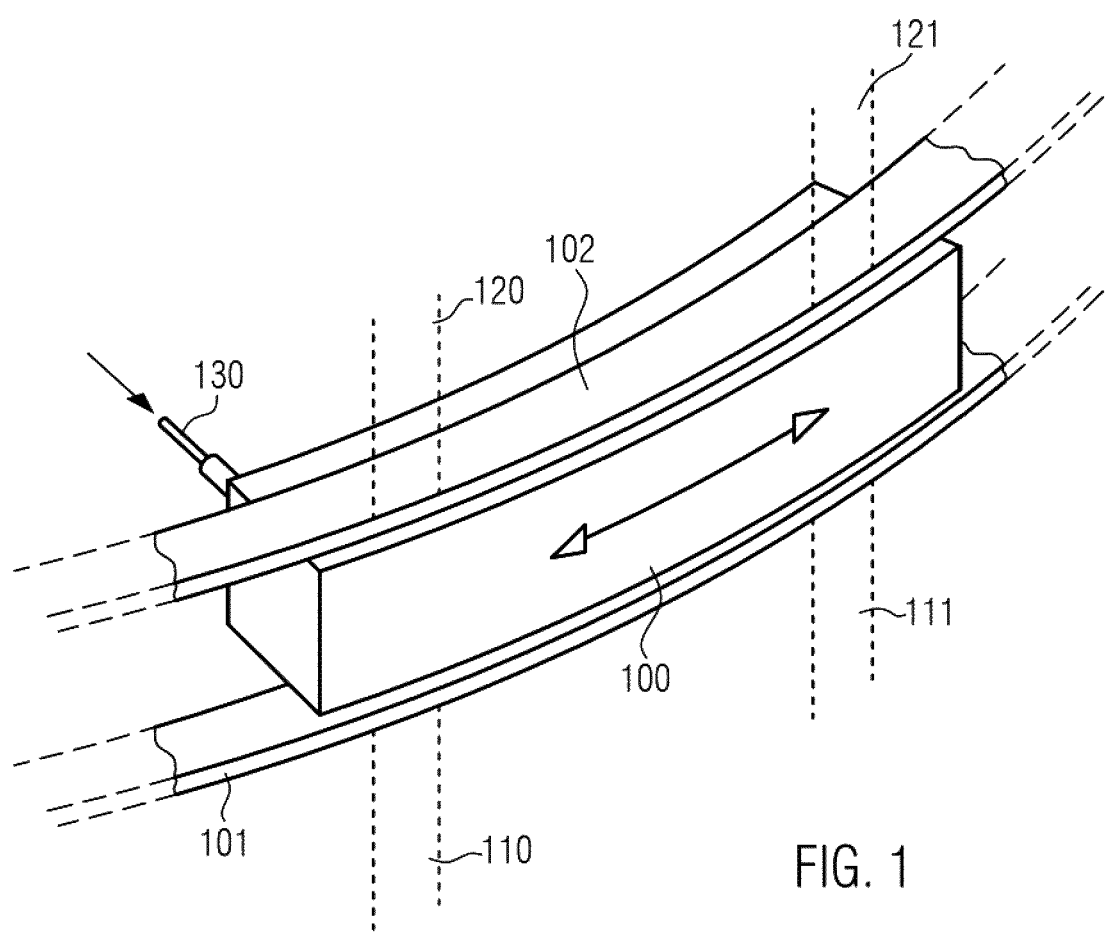
FIG. 1 shows a stator module according to the invention in relation to a linear drive of a container-handling machine.

Based on the known state of the art, the technical object to be solved in certain embodiments consists of providing a stator module for a linear drive, in particular a long-stator drive, of a container-handling machine which is better protected against environmental influences than conventional stator modules of linear drives and can nevertheless be produced as cost-effectively as possible. Previous ways of insulating the components are complex and costly by contrast.

In embodiments this object is solved according to the disclosure by the stator module according as described herein as well as the container-handling machine with a linear drive comprising such a stator module as also described herein. Additionally, a method of operating a container-handling machine is described. Advantageous further developments of the disclosure are also described.

The stator module according to embodiments of the disclosure for a linear drive of a container-handling machine in the beverage processing industry comprises a housing in which a core and at least one coil are arranged, wherein the stator module comprises a media supply for supplying a gas into the interior of the housing and the media supply is designed to apply an overpressure to the interior of the housing. This ensures that liquids, such as product to be filled into a container or cleaning agent, do not penetrate into the interior of the housing and can thus damage the components. At the same time, however, complicated encapsulation systems and complex seals can be dispensed with, as the insulation of the interior is achieved by the overpressure applied, which is technically simple and therefore cost-effective to implement.

It can be provided that at least a part of the control electronics of the stator module is arranged in the housing. These sensitive components can also be protected from contamination.

In an embodiment, the core consists of or comprises steel and/or at least two coils are arranged in the housing. Isolation of the core and coils from the external environment and in particular from wetting with liquids is particularly advantageous in this case, since all materials are electrically conductive, which could otherwise lead to short-circuits when liquids are introduced.

It may also be provided that the housing comprises a base body of a first material and an enclosure of a second material.

The base body is understood here as an essentially U-shaped, preferably metallic area in which at least the coil and the core are arranged. The base body is preferably surrounded from all sides by the enclosure. This can be in one piece (e.g. a material cast around the body) or can consist of several parts screwed together, glued together or connected in some other way. VA2 (stainless steel) is a particularly suitable material.

These materials can be metallic or non-metallic materials, in particular plastic, and the materials for the base body and the enclosure can also be different from each other. Since the interior is already sufficiently protected against the penetration of liquids by the application of the overpressure, these materials do not necessarily have to be corrosion-resistant, since the penetration of liquids through small openings, which can form during the oxidation of metals over time, is prevented by the overpressure.

In one embodiment, the first material is aluminium or stainless steel and the second is stainless steel. Since the enclosure comes into contact with liquids, the use of stainless steel can be particularly advantageous here in order to at least prevent excessive oxidation. The use of aluminium allows the weight of the base body to be reduced and, if necessary, the stator module to be manufactured more cost-effectively.

In another embodiment, the stator module is designed for use in a long-stator linear drive.

It may also be provided that the media supply is either in the form of a separately guided hose or is integrated as a hose in a control and power cable which comprises at least one line for the control electronics and at least one further line for the current supply to the coils. The first embodiment allows isolation of the media supply from the other components or lines, which improves their accessibility. In the second variant, all lines can be easily replaced by combining them in modules as described.

According to embodiments of the disclosure, the container-handling machine for handling containers in the beverage processing industry comprises a linear drive, wherein the linear drive comprises a stator module according to one of the preceding embodiments. The container-handling machine is characterized by reduced downtimes in embodiments.

It may be provided that the linear drive of the container-handling machine comprises at least two stator modules and the media supply of each stator module is connected separately from the remaining stator modules to a media supply or the media supplies of the stator modules are arranged in series.

The separate connection of the media supply of each stator module with the media supply means that as many lines as stator modules are provided that lead out of a possibly provided common storage container for the medium (for example a high-pressure gas tank) and if possible none of the lines partly coincides with one of the other lines. The series connection of the media supply of the stator modules means, for example, that a main line is provided which leads to a first stator module and a further line leads out of this stator module which leads to an adjacent stator module. A further line leads from this adjacent stator module to a stator module adjacent to this stator module until each of the stator modules is supplied with the medium or gas. A main line can also pass through all stator modules and only one branch can be provided in each stator module, through which part of the medium flowing through the main line is led into the stator module.

The container-handling machine may also be designed as a filler and the housing of the stator module may be made of stainless steel. Excessive corrosion and thus a structural weakening of the stator module can thus be avoided.

According to embodiments of the disclosure, a method of operating a container-handling machine in the beverage processing industry is provided, wherein the container-handling machine comprises a linear drive having a stator module. The stator module comprises a housing in which a core and at least one coil are disposed, the stator module comprising a media supply. The method comprises introducing a gas at an overpressure into the interior of the housing through the media supply. This prevents contamination of the interior of the stator module during operation of the container-handling machine.

In one embodiment, the gas is compressed air or an inert gas, especially nitrogen. On the one hand the penetration of liquids can be avoided and on the other hand the colonisation of microorganisms (with the use of nitrogen) can be suppressed or at least slowed down.

FIG. 1 shows a stator module 100 according to an embodiment. As shown here, the stator module can be arranged between two guides 101 and 102 for a mover, not shown here, in a container-handling machine. The guides can, for example, be circular, but also linear and the stator module 100 can be arranged between the guides or with a small offset to them.

In particular, the guides may consist of two opposing rails 101 and 102, which are arranged with respective attachments 110 and 111 or 120 and 121 on, for example, the container-handling machine (not shown here). The container-handling machine may be any container-handling machine commonly used in the beverage processing industry, in particular fillers, blow moulding machines, cleaning devices, labelling machines, printing machines, mould filling machines or the like.

The movers, which are not shown, can be connected to the guides by rollers and can move along the guides. The movers are equipped with a magnetic component so that if one or more stator modules are provided along elements 101 and 102, the movers can be moved by the attraction forces generated during operation.

According to embodiments of the disclosure, the stator module 100 comprises a media supply 130, through which a gas can be introduced into the interior of the stator module in order to generate an overpressure with respect to the environment. This overpressure can be relatively low, e.g. $\frac{1}{100}$ bar, preferably 0.05 bar, particularly preferred 0.1 bar or more. This overpressure prevents liquids or gases, but also microorganisms, from penetrating into the interior of the stator module.

Figure 2A:
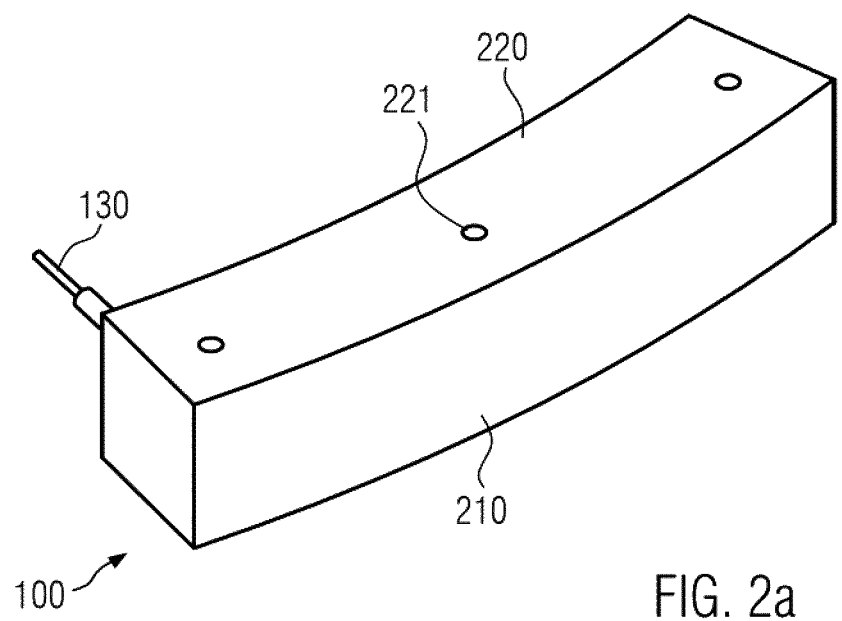
FIGS. 2a and b show a stator module according to an embodiment in front view and rear view.
Figure 2B:
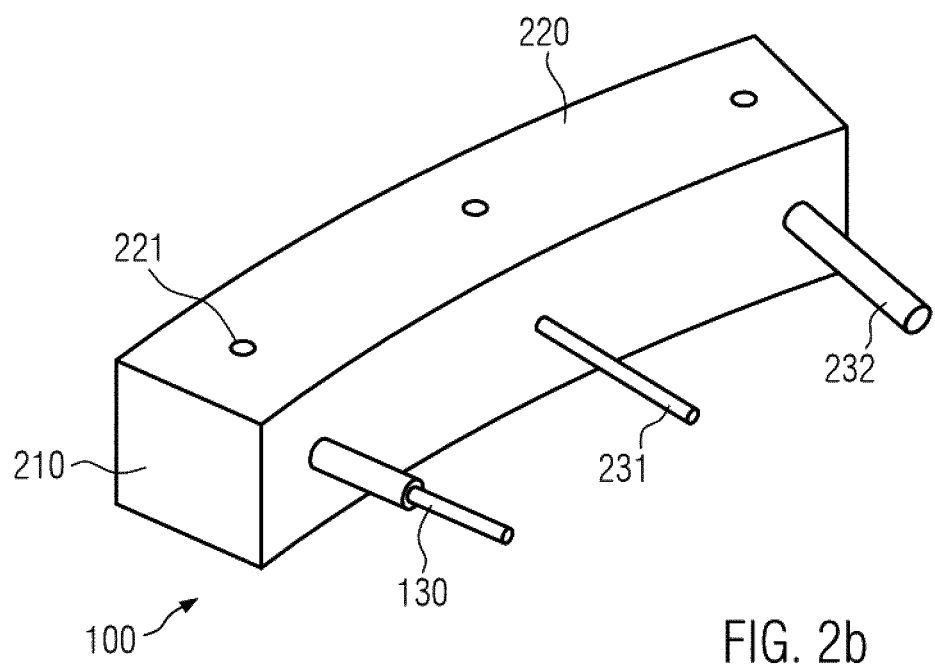

FIGS. 2a and 2b show a front view (FIG. 2a) and a rear view (FIG. 2b) of the stator module 100 from FIG. 1.

As shown in FIG. 1, the stator module is ultimately formed by a housing, formed by a base body not shown here, which can be U-shaped, for example, and in which the coil and the core of the stator module are arranged, and an enclosure, the enclosure for example being able to enclose several parts 210 and 220, which form an essentially closed body.

It may also be provided that the enclosure is formed from a cast material that substantially completely encloses the base body. For the sake of clarity, reference is made in the following to an enclosure consisting of several parts. However, all designs can also be applied to cast materials. Preferably the opening of the U-shaped base body points in the direction of the movers.

One or more openings, in particular holes 221, may be provided in one of the parts 220, with which the stator module can be fastened, for example, to a support or connected to other components. Such openings 221 can also be provided on the base body. The base body and the enclosure can also be sealed towards the outside by further seals.

The base body can be a base body made of a metal, in particular stainless steel or aluminium. However, plastics can also be used. Furthermore, the enclosure can be made of the same material as the base body, i.e. stainless steel in particular. Since the enclosure comes into contact with liquids (cleaning media, product, adhesive, etc.), it is preferable if it is made of stainless steel to prevent excessive corrosion. The base body, on the other hand, can also be made of lighter metals or semi-metals, such as aluminium, since the housing and the overpressure applied virtually completely protect it from contact with any oxidising liquids.

According to FIG. 2b, the stator module comprises the media supply 130, through which a gas can be introduced, for example from a compressed air tank, into the interior of the stator module. The gas can in particular be compressed air, as it is available at low cost and does not have to be stored in special containers. In order to better meet hygienic requirements, it can also be provided that the interior is subjected to an excess pressure of nitrogen, $CO_2$ or other sterilising gases in order to prevent the colonisation of microorganisms as far as possible.

In addition to the media supply, further lines 231 and 232 can lead into the stator module. For example, line 231 can be a line for the control electronics of the stator module and line 232 can be a power supply for the coils arranged inside the stator module. If these lines are combined in a control and power cable, it can also be provided that the media supply is not guided separately from these lines as shown here, but is integrated together with them in a line bundle. This line bundle can then preferably be connected to the stator module and the other components (media supply, central control unit and the like) via a plug connection that is as easy to release as possible, so that replacement in the event of a defective line, for example, is easily possible. Connectors that are insensitive to environmental influences such as liquids or dirt are particularly preferred. Connectors made of durable plastics can be used here.

Figure 3:
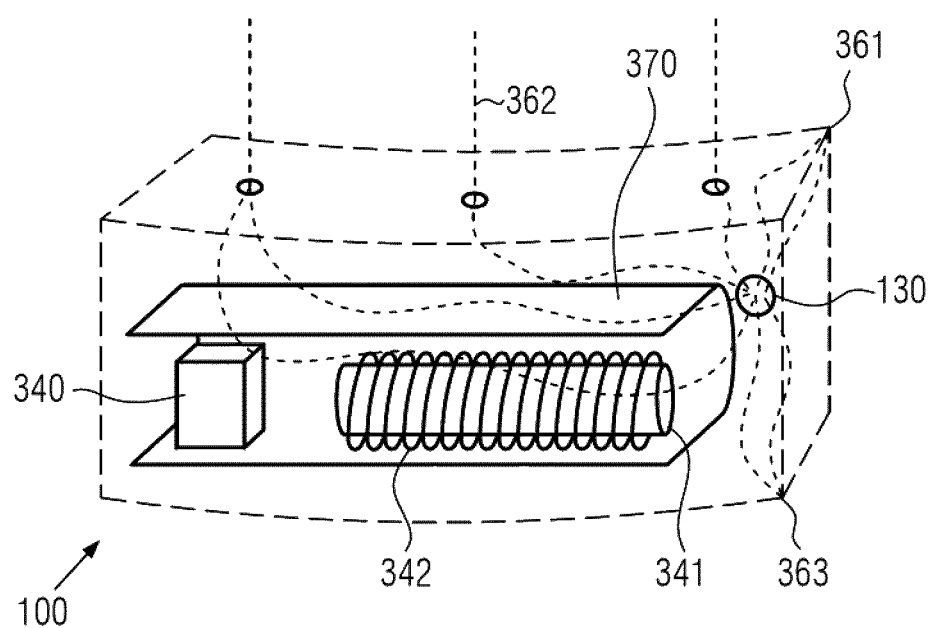
FIG. 3 shows a schematic representation of the interior of a stator module according to an embodiment.

FIG. 3 schematically shows an inside view of the stator module 100, the enclosure of which is only shown in dashed lines. The stator module comprises a core 341, which consists in particular of iron or another material with the highest possible magnetic permeability $\mu_r$, so that by applying a current to the coil 342 surrounding the core 341, the strongest possible magnetic field and thus high kinetic energy can be generated in the movers. Several coils and cores can be arranged in each stator module. In addition, at least part of the control electronics 340 of the stator module can be arranged in the stator module. These include, for example, circuits that can control the current supply to coil 342. As indicated here, the corresponding components of the stator module are arranged in the base body 370. This base body here is build U-shaped, however can also show another shape, especially square shape.

As shown here, the media supply 130 leads into the interior of the stator module, into which the gas is then introduced with an overpressure. This gas exits through small, usually not intended openings in the enclosure (gaps, holes or micro-cracks), as shown in exemplary fashion at points 361, 362 and 363.

Figure 4A:
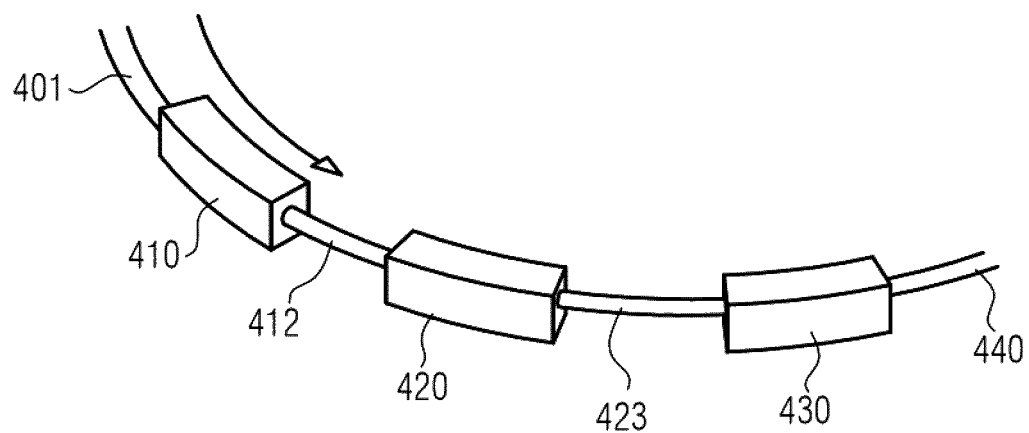
FIGS. 4a and b show two embodiments of a series of stator modules.
Figure 4B:
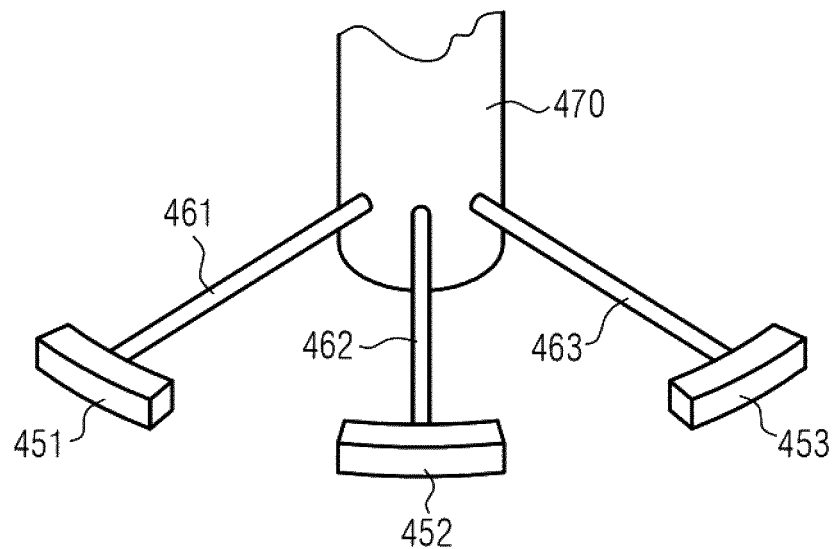

FIGS. 4a and 4b show possible realisations of the connections of a plurality of stator modules with a media supply. In FIG. 4a the stator modules 410, 420 and 430 are connected "in series" with a media supply. In this embodiment, a central media supply 401 leads through the individual stator modules and intermediate lines 412, 423 and 440 through the modules and applies the corresponding gas under a certain overpressure to each of the modules one after the other. The line 401 to 440 can be completely continuous so that it also runs through the stator module from one side of the stator module to the other side and has only one or more small outlet openings in the stator module through which the gas can escape into the respective stator module. Alternatively, line 401 to 440 may be interrupted by the respective stator modules and only the compressed air within the stator module flows from the entry point, e.g. in line 401, into the stator module up to the exit point for line 412 through the entire housing of the stator module and is only fed back into line 412 at the end. This saves material and ensures a complete flow of the gas through the stator modules under overpressure.

According to FIG. 4b, it can alternatively be provided that a central media supply 470 (e.g. a gas tank) is provided and from this as many lines 461, 462 and 463 separately lead out and lead to these respectively assigned individual stator modules 451, 452 and 453. With these media supplies 461, 462 and 463, the gas can then be distributed specifically to the stator modules and it is also possible to control and even adjust the media supply to the individual stator modules, for example by attaching controllable valves, while the media supply to the other stator modules continues independently of this.

In a further development of the embodiments according to FIGS. 4a and 4b, sensors are provided in the stator modules which measure the pressure within the stator module and control the supply of the medium in such a way that a desired pressure target value is reached at any time.

In addition, an excessively large leakage of a stator module can be detected via sensors which can be arranged in or on the supply lines.

What is claimed is:

1. A stator module for a linear drive of a container-handling machine, comprising:
   a housing in which a core and at least one coil are arranged; and
   a media supply for supplying a gas into an interior of the housing, wherein the media supply is designed to apply an overpressure to the interior of the housing to generate an overpressure in the interior of the housing, and wherein the stator module is adapted for use in a long-stator linear drive.

2. The stator module according to claim 1, further comprising:
   control electronics of the stator module at least partially arranged in the housing.

3. The stator module according to claim 2, wherein the media supply is integrated as a hose in a control and power cable which comprises at least one line for the control electronics and at least one further line for a current supply of the at least one coil.

4. The stator module according to claim 1, wherein the core comprises steel.

5. The stator module according to claim 1, wherein the housing comprises a base body of a first material and an enclosure of a second material.

6. The stator module according to claim 5, wherein the first material is aluminum or stainless steel and the second material is stainless steel.

7. The stator module according to claim 1, wherein the media supply is designed as a separately guided hose.

8. The stator module according to claim 1, wherein at least two coils are arranged in the housing.

9. A container-handling machine for handling containers, comprising:
   a linear drive, wherein the linear drive comprises at least one stator module, the at least one stator module comprising:
      a housing in which a core and at least one coil are arranged; and
      a media supply for supplying a gas into an interior of the housing, wherein the media supply is designed to apply an overpressure to the interior of the housing to generate an overpressure in the interior of the housing, and wherein the stator module is adapted for use in a long-stator linear drive.

10. The container-handling machine according to claim 9, wherein the linear drive comprises at least two stator modules and the media supply of each stator module of the at least two stator modules is connected to an additional media supply separately from the remaining stator modules of the at least two stator modules.

11. The container-handling machine according to claim 10, wherein the at least one stator module further comprises control electronics at least partially arranged in the housing.

12. The stator module according to claim 11, wherein the media supply is integrated as a hose in a control and power cable which comprises at least one line for the control electronics and at least one further line for a current supply of the at least one coil.

13. The container-handling machine according to claim 9, wherein the linear drive comprises at least two stator modules each comprising a media supply, and wherein the media supplies of the at least two stator modules are arranged in series.

14. The container-handling machine according to claim 9, wherein the container-handling machine is designed as a filler and the housing of the stator module consists of stainless steel.

15. The container-handling machine according to claim 9, wherein the housing comprises a base body of a first material and an enclosure of a second material.

16. The container-handling machine according to claim 15, wherein the first material is aluminum or stainless steel and the second material is stainless steel.

17. The container-handling machine according to claim 9, wherein the media supply is designed as a separately guided hose.

18. The container-handling machine according to claim 9, wherein the core comprises steel.

19. A method of operating a container-handling machine, comprising:

introducing a gas at an overpressure into an interior of a housing through a media supply to generate an overpressure in the interior of the housing, wherein the container-handling machine comprises a linear drive having a stator module, the stator module comprising the housing in which a core and at least one coil are disposed, the stator module further comprising the media supply, and wherein the stator module is formed for use in a long-stator linear drive.

20. The method according to claim 19, wherein the gas is compressed air or an inert gas.

* * * * *